United States Patent [19]

Alessio

[11] Patent Number: 4,574,671
[45] Date of Patent: Mar. 11, 1986

[54] RADIAL ARM OF A RADIAL ARM SAW

[75] Inventor: Lorenzo E. Alessio, Lecco, Italy

[73] Assignee: Black & Decker Inc., Newark, Del.

[21] Appl. No.: 632,804

[22] Filed: Jul. 20, 1984

[30] Foreign Application Priority Data

Aug. 2, 1983 [IT] Italy .............................. 22561/83[U]

[51] Int. Cl.[4] .............................................. B27B 5/29
[52] U.S. Cl. ..................... 83/471.2; 83/485;
 83/821; 83/825; 308/3 A
[58] Field of Search ................ 83/471.1, 471.2, 471.3,
 83/485, 486, 488, 821, 824, 825, 828; 308/3 A,
 3 R; 74/103, 104, 109

[56] References Cited

U.S. PATENT DOCUMENTS

| | | | |
|---|---|---|---|
| 2,185,304 | 1/1940 | Knapp | 308/3 A |
| 2,523,393 | 9/1950 | Rhodes | 308/3 R |
| 3,295,568 | 1/1967 | Cassey | 83/471.1 |
| 3,338,140 | 8/1967 | Sheesley | 74/109 |
| 3,482,610 | 12/1969 | Botefuhr | 83/471.3 |
| 3,650,576 | 3/1972 | Hughes | 308/3 A |

FOREIGN PATENT DOCUMENTS 542808  1/1942  United Kingdom .............. 83/471.3

Primary Examiner—Frank T. Yost
Assistant Examiner—Hien H. Phan
Attorney, Agent, or Firm—Ronald B. Sherer; Edward D. Murphy; Harold Weinstein

[57] ABSTRACT

A radial arm of a radial arm saw comprises a lightweight metal casting of inverted U cross-section and having opposing longitudinal grooves in the inner faces of the side walls of the inverted U. A metal strip of resilient arcuate cross-section is press fitted into each groove to form guides for supporting and guiding a power saw unit movable along the radial arm. The lighter weight of the radial arm is particularly advantageous for a portable radial arm saw, and the inserted metal strips form inexpensive durable guides.

9 Claims, 5 Drawing Figures

RADIAL ARM OF A RADIAL ARM SAW

FIELD OF THE INVENTION

This invention relates to a tool carrying arm which extends in cantilever manner from a support column and supports a tool carrying head for movement therealong. It particularly relates to radial arms for radial arm saws.

BACKGROUND OF THE INVENTION

Radial arms of radial arm saws have to be strong and sufficiently stable to carry in cantilever manner the suspended weight of a circular saw unit, including an electric motor for driving the saw blade, and at the same time allow precise positioning of the saw blade when cutting. This has resulted in such radial arms being robustly manufactured from steel. Although this is generally satisfactory for a permanently positioned radial arm saw, it substantially adds to the weight of the radial arm saw. This weight is a disadvantage during transportation of the machine, and is particularly so with units that are intended to be portable.

Further, the formation of guide means in these radial arms, for movement of the power tool unit therealong, can involve relatively costly precision machining.

SUMMARY OF THE INVENTION

The object of the invention is to provide a lighter weight, yet robust, radial carrying arm.

It is a further object of the invention to provide such lighter weight radial arm with guide means for the power tool unit which are durable yet inexpensive to manufacture.

A feature by which these objects are achieved is by making the radial arm from a lightweight casting and forming the guide means by arcuate cross-sectioned strips inserted in walls of the radial arm. This provides the advantage of a lighter weight radial arm with durable guide surfaces which avoid extensive precision machining and are inexpensive to manufacture.

Accordingly, therefore, the present invention provides a radial arm, for a radial arm saw, securable in cantilever manner on a support column and comprising guide means for carrying a saw unit movably therealong, said arm being a lightweight casting of inverted U cross-section, and said guide means comprising opposing longitudinal grooves in inner faces of the side walls of the inverted U and a metal strip of arcuate cross-section, which is relatively yieldable elastically, pressed into each groove.

Preferably, the grooves are recessed below the inner faces of the side walls, and may be slightly over semicircular cross-section. Preferably, the cross-section of the strips is less than a semicircle before insertion into the grooves.

Advantageously the lightweight casting may comprise aluminum and have internal reinforcing ribs.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
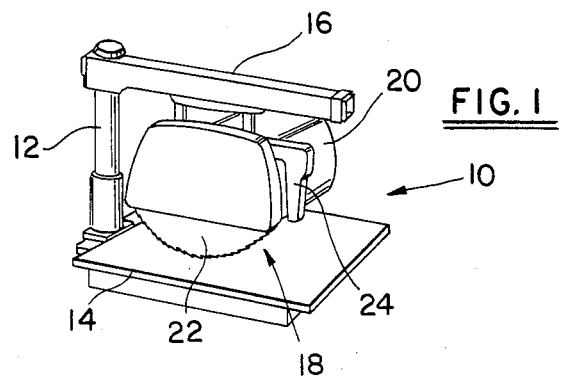
FIG. 1 illustrates a perspective view of a radial arm saw provided with a light weight radial arm according to the invention.
Figure 2:
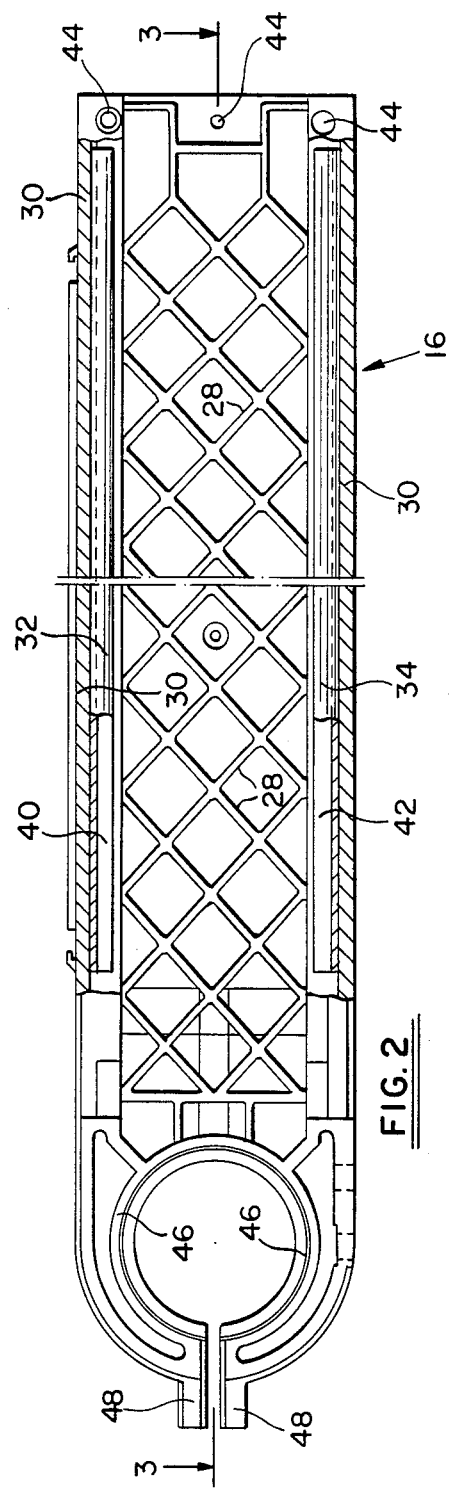
FIG. 2 is a plan view from below, partly broken away and sectioned, of the radial arm of FIG. 1.

FIG. 1 illustrates a portable radial saw 10 having a support column 12 upstanding from a base 14 with a radial arm 16 adjustably clamped at its rear end on the column 12 and extending therefrom in cantilever manner. A circular saw unit 18 is suspended from and slidable along the radial arm 16. The power saw unit 18 conventionally has an electric drive motor 20, a circular saw blade 22 driven thereby, and a handle 24 for moving the saw unit 18 along the radial arm 16 when cutting a workpiece supported on the base 14. FIGS. 2 to 5 show in greater detail the radial arm 16 which is cast from lightweight alloy, preferably of aluminum, and has a cross-section of generally inverted U-shape (see FIGS. 4 and 5). The base 26 (i.e. top wall) of this U-section is of very small thickness and is formed internally with a matrix of reinforcing ribs 28 in a diamond pattern. The legs or side walls 30 of the U-section depending downwardly from the base 26 are ribbed and increase in thickness in the downward direction, as particularly shown in FIG. 5. Opposing, longitudinal, semi-cylindrical channels 32, 34 are provided in the inner surfaces of the side walls 30 and extend parallel to and adjacent the lower edges 36 of these side walls. Arcuate cross-sectioned metal guides 40, 42 are inserted in these channels 32, 34, respectively, which form seats therefor as will be described more fully later. In FIG. 2 part of the lengths of the guides 40, 42 are broken away on the right to expose the channels 32, 34. The power tool unit 18 is movably carried by these guides 40, 42, and bores 44 closely adjacent the distal end of the radial arm 16 are arranged to receive means for limiting outward movement of the power tool unit 18 once mounted. At the other end, the radial arm 16 is formed with a pair of opposing arcuate clamping portions 46 which are separated from each other at the extreme end by integral flat lugs 48. The clamping portions 46 slidably fit around the support column 12 and are clamped thereon by a bolt (not shown) extending through bores 50 in the lugs 48.

Figure 5:
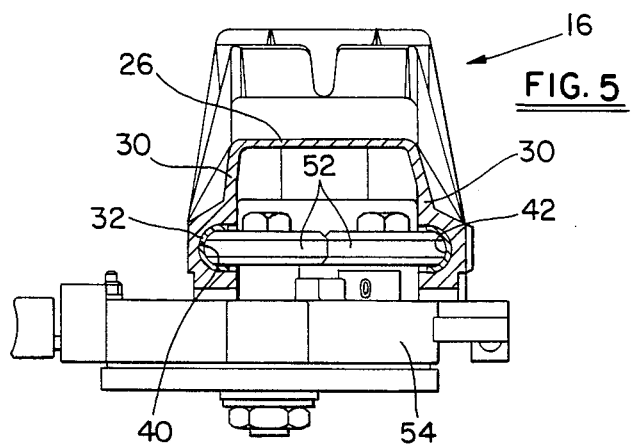
FIG. 5 is a similar view to FIG. 4 showing a tool carriage inserted in and supported by the guides, the radial arm being partly in section.

FIG. 5 shows wheels 52, rotatable about vertical axes, of a carriage 54 supportedly engaged in the pair of opposed guides 40, 42, the carriage 54 carrying the saw unit 18 suspended therefrom. As the saw unit is moved along the radial arm 16, the wheels rotate in their respective guides 40, 42.

Figure 4:
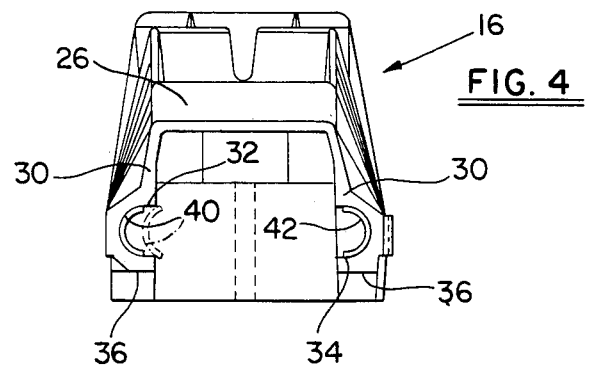
FIG. 4 is a front view of the radial arm in the direction of the arrow 4 in FIG. 3 and also showing one of the guide strips in phantom before insertion.
Figure 3:
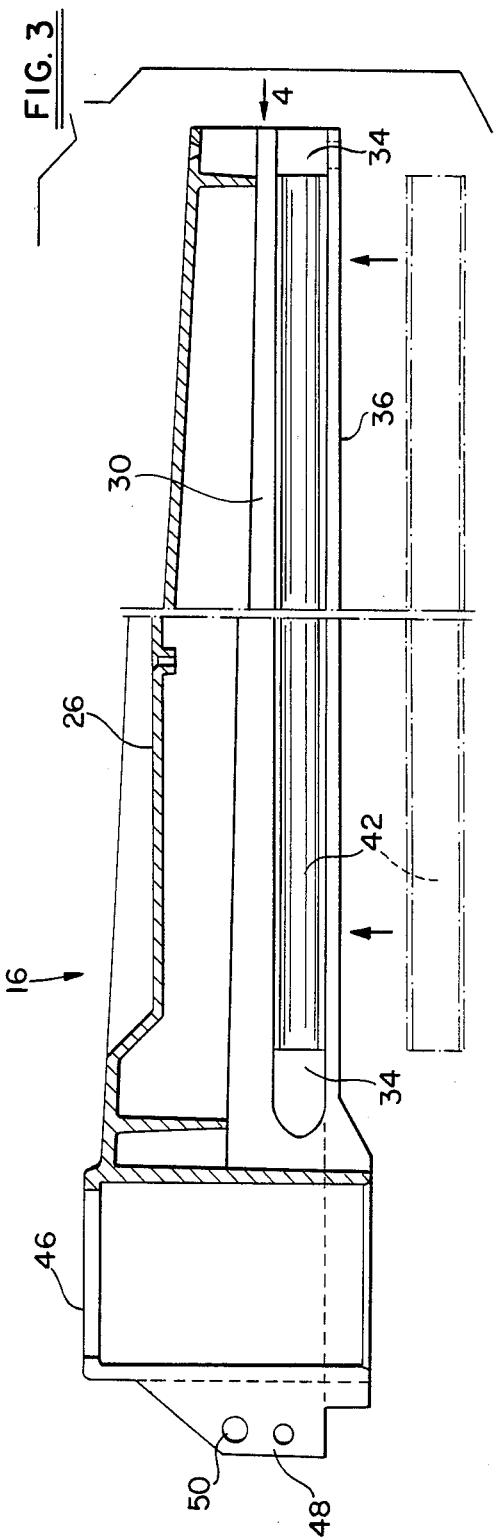
FIG. 3 is a vertical section on the line 3—3 of FIG. 2 also showing an arcuate sectioned guide strip in phantom lines before insertion in the radial arm.

FIGS. 3 and 4 show in phantom lines respectively the guides 42, 40 before being inserted in their respective grooves 34, 36. Each guide 40, 42 is formed from a strip of metal, for example steel, which is elastically yieldable and resistant to the friction created by the wheels 52. These arcuate cross-sectioned strips 40, 42 are pressed laterally onto their respective seats 32, 34. Preferably each strip has an arcuate cross-section which is less than a semicircle before insertion, see FIG. 4, and is deformed into a semicircle upon insertion. These seat grooves 32, 34 are cast in the side walls 30, but may be machined if desired. Preferably, the grooves 32, 34 are recessed below the inner surfaces of the side walls 30 as can be seen in FIGS. 2, 4 and 5; in this way the outer longitudinal edges of the strips 40, 42 can bite into the softer aluminum walls of the grooves 32, 34 once inserted therein, this being due to the resiliency of the deformed arcuate cross-section of the strips. Also, the cross-section of the seats 32, 34 may be slightly greater than a semicircle to provide a slight "necking" effect on the guide strips 40, 42 for more positive retention of the latter once inserted in the seats.

It will be appreciated that a tool carrying arm constructed as above is of considerable lightness combined with considerable robustness deriving from the particular structure thereof.

In addition, the guide means formed by the two arcuate cross-sectioned guides enables precise guiding of the tool carriage together with precise stable positioning at the required point of operation.

Further, if these guides become worn or defective, the metal strips can be readily replaced, so avoiding difficult, lengthy and costly guide reconstruction.

The above described embodiments, of course, are not to be construed as limiting the breadth of the present invention. Modifications, and other alternative constructions, will be apparent which are within the spirit and scope of the invention as defined in the appended claims.

What is claimed is:

1. A radial arm for a radial arm saw, comprising:
an elongate arm comprising a lightweight metal casting of inverted U cross-section;
said arm having a top wall and two side walls extending downwardly;
guide means for supporting and guiding a saw unit along said elongate arm, said guide means comprising opposing longitudinal grooves in inner faces of said side walls of the elongate arm of inverted U cross-section and a metal strip pressed into each groove;
each of said metal strips being relatively elastically yieldable and being arcuately deformed in cross-section by engagement in the respective groove; and
said grooves being of semicircular cross-section and recessed below the inner faces of said side walls, longitudinal edges of the strips biting into walls of the grooves due to the deformed strips being elastically yieldable.

2. The radial arm of claim 1, wherein each of said strips has a cross-section which is less than a semicircle and is deformed into a semicircle upon being pressed into the respective groove.

3. The radial arm of claim 1, wherein said casting comprises aluminum.

4. The radial arm of claim 3, wherein said arm has reinforcing ribs on an inner surface thereof.

5. A radial arm for a radial arm saw, comprising:
a elongate arm comprising an aluminum casting of inverted U cross-section and having an upper wall with opposing sides walls depending downwardly from opposite sides thereof;
said side walls having opposing longitudinal grooves in the inner faces thereof, the cross-section of each groove comprising a semicircle recessed back from the respective inner face;
said upper wall having reinforcing ribs on the inner face thereof, and said side walls increasing in cross-sectional thickness in the downward direction;
a resilient steel strip of arcuate cross-section press fitted into each said groove and occupying a semicircular cross-sectional configuration therein to form guides for supporting and guiding a saw unit when suspended from the radial arm for movement therealong;
each said strip having a cross-section which is less than a semicircle and being deformed into a semicircle upon being pressed into the respective groove; and
longitudinal edges of the strips biting into walls of said grooves due to the deformed strips being resilient and the aluminum casting being softer than the steel strips.

6. The radial arm of claim 5, wherein said elongate arm has opposing arcuate clamping portions at one end for clamping the arm to a support column of the radial arm saw.

7. The radial arm of claim 6, wherein said reinforcing ribs form a matrix in a diamond pattern.

8. A portable radial arm saw, comprising:
a base;
a support column mounted on said base;
a radial arm clamped on said support column and extending in cantilever manner therefrom above said base;
a power saw unit suspended from and manually movable along said radial arm;
said radial arm comprising a lightweight metal casting having a top wall and two opposed and spaced apart longitudinal side walls extending downwardly;
said side walls having opposing longitudinal grooves in inner faces thereof, the cross-section of each groove comprising a semicircle;
a steel strip of resilient arcuate cross-section pressed into each said groove and occupying a semicircular configuration therein;
each said strip having a cross-section which is less than a semicircle and being resiliently deformed into a semicircle upon being pressed into its respective groove;
longitudinal edges of each said strip biting into a wall of the respective groove due to the resiliency of the deformed strips and the casting being softer than the steel strips; and
a carriage by which said power saw unit is carried and having wheels rotatable about upright axes and engaged in said steel strips, whereby said steel strips function both to support and guide said power saw unit.

9. A radial arm for a radial arm saw, comprising: an elongate arm comprising a lightweight metal casting of inverted U cross-section;
said arm having a top wall and two opposed side walls extending downwardly;
guide means for supporting and guiding a saw unit along said elongate arm, said guide means comprising opposing longitudinal grooves in inner faces of said side walls of said arm and an elongate metal strip pressed into each groove;

each of said metal strips being elastically yieldable and being arcuately deformed in cross-section by engagement in the respective groove;
each said strip having a semicircular cross-section when arcuately deformed; and
said grooves having a cross-section which is slightly greater than a semicircle to provide a necking effect on the arcuately deformed, elastically yieldable strips for more positive retention of the latter once inserted in the grooves.

* * * * *